United States Patent [19]

Figovsky

[11] Patent Number: 6,120,905
[45] Date of Patent: Sep. 19, 2000

[54] HYBRID NONISOCYANATE POLYURETHANE NETWORK POLYMERS AND COMPOSITES FORMED THEREFROM

[75] Inventor: Oleg L. Figovsky, Haifa, Israel

[73] Assignee: Eurotech, Ltd., Washington, D.C.

[21] Appl. No.: 09/094,864

[22] Filed: Jun. 15, 1998

[51] Int. Cl.[7] .................................................. B32B 27/40
[52] U.S. Cl. ...................... 428/425.6; 525/423; 528/106; 528/121; 528/407
[58] Field of Search ............................ 525/423; 528/106, 528/121, 407; 428/425.6

[56] References Cited

U.S. PATENT DOCUMENTS

| | | |
|---|---|---|
| 2,324,483 | 7/1943 | Castan . |
| 2,441,298 | 5/1948 | Strain . |
| 3,929,731 | 12/1975 | Volkova et al. . |
| 4,707,315 | 11/1987 | Joh et al. . |
| 4,758,615 | 7/1988 | Engel et al. . |
| 5,175,231 | 12/1992 | Rappoport et al. ................... 528/106 |
| 5,340,889 | 8/1994 | Crawford et al. . |

FOREIGN PATENT DOCUMENTS

| | | |
|---|---|---|
| 246901 | 6/1987 | Germany . |
| 3723782C2 | 1/1989 | Germany . |
| 1353792 A1 | 11/1987 | U.S.S.R. . |
| 1754748 A1 | 8/1992 | U.S.S.R. . |

OTHER PUBLICATIONS

W.J. Blank, "Non–Isocyanate Routes to Polyurethane", Proceedings of the 17$^{th}$ Water–Borne and Higher Solids CoatingS Symposium, New Orleans, LA, Feb. 21–23, 1990, pp. 279–291.

Oleg L. Figovsky, et al. "Non–Isocyanate Polyurethane", Polyurethanes World Congress '97, Amsterdam, Sep. 29–Oct. 1, Poster No. 70, pp. 1–7.

O.L. Figovsky, "Improving the Protective Properties of Nonmetallic Corrosion—Resistant Materials and Coatings", J. Mendeneev Chem. Soc., 33(3) : 31–36 (1988).

"Kirk–Othmer Encyclopedia of Chemical Technology", 4$^{th}$ Ed., vol. 1, pp. 913–925 (1991); vol. 77 pp. 1–60 (1993); pp. 730–755 (1994).

*Primary Examiner*—Robert Dawson
*Assistant Examiner*—D. Aylward
*Attorney, Agent, or Firm*—Pennie & Edmonds LLP

[57] ABSTRACT

This invention relates to a hybrid nonisocyanate polyurethane network polymer formed by cross-linking at least one cyclocarbonate oligomer and at least one amine oligomer. The cyclocarbonate oligomer contains a plurality of terminal cyclocarbonate groups. At least one cyclocarbonate oligomer further comprises from about 4% to about 12% by weight of terminal epoxy groups. Because at least one cyclocarbonate oligomer contains both cyclocarbonate and epoxy reactive groups, the network formed therefrom is referred to as a hybrid nonisocyanate polyurethane network. The cyclocarbonate oligomer or oligomers have an average functionality towards primary amines of from about 2.0 to about 5.44. The amine oligomer comprises at least one primary amine-terminated oligomer terminated with primary amine groups and has an average functionality towards cyclocarbonate groups of from about 3.0 to about 3.8. The amine oligomer is present in an amount from about 0.93 to about 0.99 of the amount of the amine oligomer that would be required to achieve a stoichiometric ratio between the primary amine groups of the amine oligomer and the cyclocarbonate groups of the cyclocarbonate oligomer. The hybrid nonisocyanate polyurethane network polymer formed has a gel fraction of not less than about 0.96 by weight. This invention also relates to methods of making hybrid nonisocyanate polyurethane networks and their use as a composite matrix material.

51 Claims, No Drawings

HYBRID NONISOCYANATE POLYURETHANE NETWORK POLYMERS AND COMPOSITES FORMED THEREFROM

TECHNICAL FIELD

The present invention is related to network polymers, more specifically, to methods of producing hybrid nonisocyanate polyurethane networks, based on reactions between oligomers comprising terminal cyclocarbonate groups and oligomers comprising terminal primary amine groups, and the hybrid network nonisocyanate polyurethanes produced thereby.

BACKGROUND OF THE INVENTION

Hybrid network nonisocyanate polyurethane materials are completely different, in structure and in properties, from linear and network polyurethanes produced from oligomers and/or starting materials comprising isocyanate groups.

The conventional method of producing linear and network polyurethane compounds is based on the reaction between oligomers with terminal hydroxyl groups and oligomers with terminal isocyanate groups. This method is disadvantageous because it uses toxic isocyanates, which are produced from an even more dangerous component, phosgene. Another principal limitation of the conventional polyurethane method of production is the more highly porous material which it yields. Because the conventional urethane-forming reaction is sensitive to moisture, an undesirable side-reaction with water leads to the formation of carbon dioxide gas within the polyurethane during its production. These gas bubbles give rise to the increased porosity of such polyurethane products.

Moreover, conventional polyurethanes derived from isocyanates are not suitable for use in many applications, e.g., as composite matrix materials, mastics, etc., because they have an inherent weakness arising from their molecular composition. Within their polymer structure are hydrolytically unstable chemical bonds which make these materials highly vulnerable to environmental degradation. For example, the use of conventionally produced polyurethane matrix materials is limited by their hydrolytic instability and their poor chemical resistance to aqueous solutions of acids and alkalies.

By modifying the structure of the polymer, a promising method of raising mechanical performance and hydrolytic stability is introduced in the form of a nonisocyanate polyurethane network, a modified polyurethane with lower permeability and increased chemical resistance properties to aqueous solutions of acids and alkalies. Moreover, nonisocyanate polyurethane networks are made by a synthesis process that uses far more environmentally benign materials than isocyanates and phosgene.

The preparation and properties of linear nonisocyanate polyurethanes is disclosed by W. J. Blank ["Non-Isocyanate Routes to Polyurethanes", Proceedings of the 17th Water-Borne and Higher Solids Coatings Symposium, New Orleans, La., Feb. 21–23, 1990, pp. 279–291]. The preparation of a dihydroxy terminated nonisocyanate polyurethane diol, its self-condensation, and the condensation of this diol with other diols, such as polytetramethylene glycol and hydroxy terminated polyester, is disclosed. However, this publication does not teach that nonisocyanate polyurethane networks may be formed, that a reactant comprising terminal cyclocarbonate groups may be used to form a nonisocyanate polyurethane network, or that a reactant comprising terminal primary amine groups may be used to form a nonisocyanate polyurethane network.

Additionally, U.S. Pat. No. 5,340,889 to Crawford et al. discloses a method for producing linear nonisocyanate polyurethanes based on the reaction between the oligomeric bifunctional cyclocarbonate oligomers described therein and amines. However, polyurethanes formed by this method, because they lack a cross-linked network structure, cannot be used for construction and structural materials. Moreover, for the same reason, these materials are not very chemically resistant to aqueous solutions of acids and alkalies.

The above-described deficiencies in conventional linear polyurethanes, conventional network polyurethanes and linear nonisocyanate polyurethanes can be remedied by the formation of a network comprising nonisocyanate polyurethanes. For example, after hardening by cross-linking or curing, network nonisocyanate polyurethanes may be used as the matrix of composite materials which serve as structural components. Moreover, these materials are also useful as:

nonporous monolithic coatings, coverings and linings, which can be used for the corrosion protection and wear protection of concrete, metallic and wood surfaces;

hydrolysis-stable and gasoline-stable sealants, which can be used for protection of electronic devices and their components, in aircraft and rocket construction and, mainly, for civil engineering applications;

glues with high adhesion strength and longevity, which can be used for joining all types of materials, e.g., metals, ceramics, glass, etc.;

reinforced and highly-filled polymers, which can be used for civil and chemical engineering applications.

Other potential areas where nonisocyanate polyurethane networks are useful include automotive applications, such as for bumpers, dashboards, seating, trim components, truck beds and repair putty; construction applications, such as concrete additives, flooring and crack barriers; marine applications, such as decking; and consumer products, such as appliances, footwear, furniture and toys.

Nonisocyanate polyurethane matrices which are intended for applications such as those described above must be characterized by a relatively high level of mechanical properties, such as high tensile strength and high relative elongation, and also have low porosity, high hydrolytic stability and high chemical resistance to aqueous solutions of acids and alkalies. Also, the process of making these compounds is desirable because it uses nontoxic reactants.

U.S. Pat. No. 1,754,748 discloses an epoxy resin-based composite material used for monolithic flooring. The compositions of this reference also contain an oligomeric dicyclocarbonate modifier and, as a hardener, an aminophenol which is monofunctional toward the cyclocarbonate terminal groups of the modifier. Thus, these materials do not comprise a nonisocyanate polyurethane network but comprise, as a matrix, an epoxy polymer network which immobilizes a small amount of linear, low-molecular weight nonisocyanate polyurethane formed from the oligomeric dicyclocarbonate and aminophenol.

U.S. Pat. No. 5,175,231 to Rappoport et al. discloses the formation, in a multi-step process, of a network comprising nonisocyanate polyurethane links in its structure. The disclosed network is formed from reactions in which a cyclocarbonate is reacted with an amine and an amine is reacted with an epoxide, however, the reactants used and the method of network formation are completely different from the present invention. This patent discloses that, in a first step, oligomers comprising cyclocarbonate are formed from epoxide resins. Then, an end-capping step is carried out in which these oligomers are end-capped with a diamine, the two amine groups of the diamine reactant having different reactivity. Finally, the amine end-capped oligomer is cross-linked by reacting it with an epoxy resin to form a network structure. In contrast, the present invention differs, inter alia, by not requiring diamines where the two amine groups of the diamine have different reactivity, nor does it require that epoxy resins be used to provide cross-linking.

SUMMARY OF THE INVENTION

One embodiment of the present invention relates to a hybrid nonisocyanate polyurethane network polymer formed by cross-linking at least one cyclocarbonate oligomer and at least one amine oligomer. The cyclocarbonate oligomer contains a plurality of terminal cyclocarbonate groups. When, for example, a cyclocarbonate oligomer contains three cyclocarbonate terminal groups, its functionality is three. In addition to containing a plurality of terminal cyclocarbonate groups, at least one cyclocarbonate oligomer further comprises from about 4% to about 12% by weight (wt. %) of terminal epoxy groups based on the weight of terminal cyclocarbonate groups present. The cyclocarbonate oligomer or oligomers have an average functionality towards primary amines of from about 2.0 to about 5.44. Determination of the average functionality of the reactants which form the nonisocyanate polyurethane network is discussed in detail below.

The amine oligomer comprises at least one primary amine-terminated oligomer terminated with a plurality of primary amine groups and has an average functionality towards cyclocarbonate groups of from about 3.0 to about 3.8. The amine oligomer is present in an amount from about 0.93 to about 0.99 of the amount of the amine oligomer that would be required to achieve a stoichiometric ratio between the primary amine groups of the amine oligomer and the cyclocarbonate groups of the cyclocarbonate oligomer.

Because at least one cyclocarbonate oligomer comprises both cyclocarbonate and epoxy reactive groups, the network formed therefrom is referred to as a hybrid nonisocyanate polyurethane network. The hybrid nonisocyanate polyurethane network polymer formed has a gel fraction, i.e., the weight fraction of insoluble material, of not less than about 0.96.

In another embodiment, the invention relates to a method of producing a network nonisocyanate polyurethane polymer which comprises:

(a) selecting least one oligomer terminated with a plurality of cyclocarbonate groups, the cyclocarbonate-terminated oligomer further comprising from about 4% to about 12% by weight of terminal epoxy groups based on the weight of terminal cyclocarbonate groups present, where the oligomer has an average functionality towards primary amines of from about 2.0 to about 5.44;

(b) selecting at least one other oligomer terminated with a plurality of primary amine groups, where the amine oligomer has an average functionality towards cyclocarbonate groups of from about 3.0 to about 3.8;

(c) mixing the oligomers in an amount to form a mixture with a pot life such that the amount of the amine oligomer(s) present is from about 0.93 to about 0.99 of the amount of the amine oligomer(s) that would be required to achieve a stoichiometric ratio between the primary amine groups of the amine oligomer(s) and the cyclocarbonate groups of the cyclocarbonate-terminated oligomer(s); and (d) curing the mixture at a temperature of from about 10° C. to about 140° C. to form a hybrid nonisocyanate polyurethane network polymer with a gel fraction of not less than about 0.96 by weight.

A further embodiment of the present invention is directed to a composite material comprising a matrix and a reinforcement, where the hybrid nonisocyanate polyurethane network is present in the matrix of the composite. The reinforcement of the composite may be at least one fiber reinforcement, at least one particulate reinforcement, or mixtures thereof.

The present invention is also directed to an additional embodiment where the already good chemical resistance of a nonisocyanate polyurethane network is increased even further by adding a particulate, such as an inorganic powder known as an active filler, along with the oligomeric mixture being fabricated into the network to form a particulate reinforced composite, where the active filler comprises the particulate reinforcement and the hybrid nonisocyanate polyurethane network comprises the matrix of the composite.

DETAILED DESCRIPTION OF THE INVENTION

Nonisocyanate polyurethane networks are formed from the reaction between a cyclocarbonate reactant, which typically is an oligomer or a mixture of oligomers comprising terminal cyclocarbonate groups, and at least one primary diamine and/or polyamine, which typically is an oligomer or a mixture of oligomers comprising terminal primary amine groups. Within this structure, an intramolecular hydrogen bond is thought to form which is able to raise the hydrolytic stability of the nonisocyanate polyurethane. Generally, materials containing intramolecular hydrogen bonds have chemical resistance from 1.5 to 2 times greater than materials of similar chemical structure but without such bonds.

Nonisocyanate polyurethane networks exhibit superior resistance properties to chemical degradation, from 30% to 50% greater than conventional polyurethanes. Nonisocyanate polyurethane networks also have significantly reduced permeability, from 3 to 4 times less than conventional polyurethanes. Unlike conventional polyurethanes that have a porous structure, nonisocyanate polyurethane networks form a material substantially free of pores because, during their formation, they are not sensitive to moisture on surfaces or fillers. Since they are not formed from highly toxic isocyanate compounds, nonisocyanate polyurethanes can be easily and safely synthesized with material hardening commonly occurring at room temperature.

A mechanism by which the hydrolytic stability is raised is thought to involve hydrogen bond formation through the introduction, into the nonisocyanate polyurethane network, of hydroxy groups adjacent to the urethane carbonyl groups. Network nonisocyanate polyurethanes are formed from the reaction of a cyclocarbonate group and a primary amine group to form a urethane link. Without limitation to any particular theory, after the urethane-forming reaction occurs, an intramolecular hydrogen bond is thought to be formed between the urethane carbonyl oxygen and the hydroxy group at the β-carbon atom of the urethane link to form a 7-member ring structure as illustrated below:

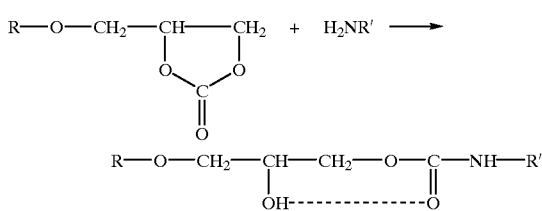

In such systems, a stabilizing effect is thought to occur because of the redistribution of charges which arises from the formation of tautomeric resonance structures. Quantum-mechanical calculations and IR and NMR spectroscopic investigations reported in the technical literature affirm the stability of such a ring. [See O. L. Figovsky, "Improving the Protective Properties of Nonmetallic Corrosion-Resistant Materials and Coatings", J. Mendeleev Chem. Soc., 33(3):31–36 (1988).]

The "blockage" of the carbonyl oxygen by hydrogen bonding considerably lowers the susceptibility of the entire urethane group to hydrolysis. Moreover, materials containing intramolecular hydrogen bonds display chemical resistance to aqueous solutions of acids and alkalies from 1.5 to 2 times greater than materials of similar chemical structure without such bonds. For example, the chemical resistance of adhesives based on nonisocyanate polyurethane materials containing intramolecular hydrogen bonds is increased over conventional polyurethane network adhesives of similar chemical structure lacking such bonds.

The present invention uses cyclocarbonate oligomers and primary amine oligomers as reactants for forming hybrid nonisocyanate polyurethane networks. Cyclocarbonate oligomers may be formed, for example, by bubbling carbon dioxide through liquid epoxy oligomers in the presence of a catalyst, by reacting oligomeric chlorohydrin ethers with carbonates of alkaline metals, or by reacting oligomeric polyols with an acid chloride of carbonic acid.

Exemplary cyclocarbonate oligomers include but are not limited to those shown below as structures (I) and (II):

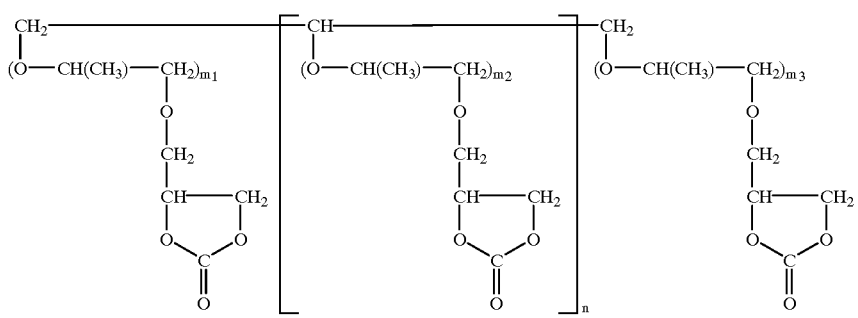

where $m_1$, $m_2$ and $m_3$ are independently selected over the range from 3 to 12 inclusive and $0 \leq n \leq 6$; and

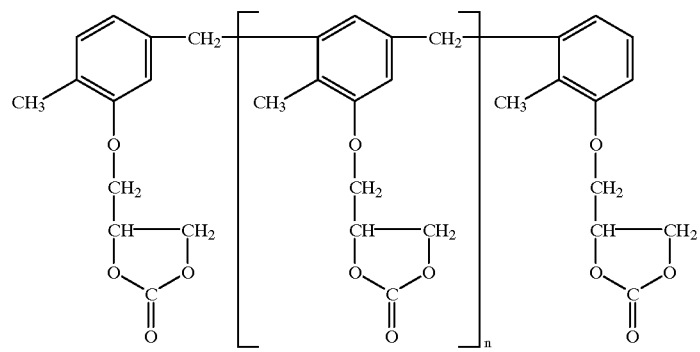

where $0 \leq n \leq 4$. Specially synthesized oligomeric cyclocarbonates, some examples of which will be described in detail in Example 1, may also be used.

In general, materials with multiple hydroxy or epoxy groups, such as commercial triols and triepoxides, may be used as starting materials for the formation of cyclocarbonate oligomers. These starting materials typically contain, as their backbones, polypropylene ethers, polyesters, alkyds, polybutadiene, polyisoprene, polysiloxane, polyphosphazine, etc.

Polyol starting materials suitable for synthesizing cyclocarbonate oligomers useful in the present invention are well known to those in the art and include but are not limited to trimethylolethane, trimethylolpropane, ditrimethylolpropane, pentaerythritol, dipentaerythritol, tripentaerythritol and the other polyols described in further detail in the "Kirk-Othmer Encyclopedia of Chemical Technology", 4th Ed., Vol. 1, pp. 913–925 (1991) which is incorporated herein by reference.

Epoxy starting materials suitable for use in the present invention are well known to those in the art and include but are not limited to epoxy cresol-novolak resins, epoxy phenol-novolak resins, polynuclear phenol-glycidyl ether-derived resins, triglycidyl p-aminophenol-derived resins, triazine-based resins, aliphatic glycidyl ethers and the other polyfunctional epoxides described in further detail in the "Kirk-Othmer Encyclopedia of Chemical Technology", 4th Ed., Vol. 9, pp. 730–755 (1994) which is incorporated herein by reference.

Well known synthetic methods for converting epoxides into cyclocarbonates, for example, those disclosed in U.S. Pat. No. 5,340,889 to Crawford et al., can be readily adapted for converting such materials into cyclocarbonate oligomers suitable for use in the present invention.

The exemplary cyclocarbonate oligomers shown in (I) and (II) above comprise only terminal cyclocarbonate (hereafter "CC") groups. While not shown in (I) and (II) above, it is essential for the successful implementation of the invention that some portion of the cyclocarbonate oligomer component also comprise at least one terminal epoxy (hereafter "EP") functional group. For example, in (II) for n=1, one of the three terminal cyclocarbonate functional groups can be replaced by a terminal epoxide group to yield a so-called epoxy modified cyclocarbonate oligomer. Such a molecule therefore comprises two CC groups and one EP group. Therefore, it will be understood that the term "cyclocarbonate oligomer" as used herein includes molecules comprising only cyclocarbonate terminal groups and molecules comprising both terminal cyclocarbonate groups and a terminal epoxy group or groups. Thus, network polymers formed from such epoxy comprising oligomers are sometimes referred to as hybrid nonisocyanate polyurethane network polymers to distinguish them from nonisocyanate polyurethane networks formed only by the reaction of cyclocarbonate and amine terminal groups. As used herein, the terms hybrid nonisocyanate polyurethane network and nonisocyanate polyurethane network are synonymous.

The synthesis of an epoxy modified cyclocarbonate oligomer can readily be accomplished, for example, by bubbling less than the stoichiometric amount of carbon dioxide through the liquid epoxy oligomer precursor of (II) in the presence of a catalyst. Thusly, only a portion of the epoxy groups in the precursor are converted to cyclocarbonate groups.

It is thought that the reaction between EP and amine groups occurs preferentially during the early stages of network formation over the reaction between CC and amine groups. Thus, oligomers comprising two, or more, EP groups might react with a diamine component of the amine terminated oligomer to form a linear polymer which, when entangled by the later-forming network, forms a clathrate. Were a clathrate to form, the overall network produced would be inhomogeneous. Inhomogeneity is thought to be undesirable because it may lead to a deterioration of network properties, e.g., mechanical properties. Therefore, it is preferred that substantially no cyclocarbonate oligomer comprise two, or more, EP groups per molecule so that the possibility of forming a linear polymer between a diepoxide and a diamine is eliminated.

The terminal EP groups of the cyclocarbonate oligomer may be bonded to a primary carbon atom of the oligomer, i.e., a carbon atom with two hydrogen substituents, as illustrated in structure (III):

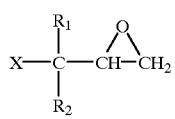

(III)

wherein $R_1$ and $R_2$ are hydrogen and X is the remainder of the cyclocarbonate oligomer. Alternatively, the carbon atom adjacent to the EP group may be secondary, i.e., only one of $R_1$ and $R_2$ is hydrogen, or tertiary, i.e., neither one of $R_1$ and $R_2$ is hydrogen. Preferably, when the cyclocarbonate oligomer comprises a terminal EP group, the EP group is bonded to the remainder of the cyclocarbonate oligomer by at least one primary carbon atom adjacent to the EP group.

The desired CC:EP weight ratio of the cyclocarbonate reactant ranges from about 1:0.04 to about 1:0.12, i.e., from about 4% to about 12% by weight of terminal epoxy groups based on the weight of terminal cyclocarbonate groups present in the cyclocarbonate reactant. Cyclocarbonate reactants comprising terminal epoxy groups present within this range are preferred, e.g., because the networks prepared therefrom have good resistance to hydrolysis. If the amount of EP groups is too low, i.e., less than about 4 wt. %, the nonisocyanate polyurethane network resulting therefrom generally has poor tensile strength. If the amount of EP groups is too high, i.e., greater than about 12 wt. %, the nonisocyanate polyurethane network resulting therefrom is generally brittle and has an ultimate elongation which is too low. By using mixtures of different cyclocarbonate oligomers, e.g., at least one cyclocarbonate oligomer comprising a terminal EP group and at least one other cyclocarbonate oligomer comprising only terminal CC groups, it is possible to prepare cyclocarbonate oligomer compositions with the desired CC:EP weight ratio.

Each terminal primary amine group may react with only one terminal cyclocarbonate group to form, for example, a structure labeled as (IV) in the figure below:

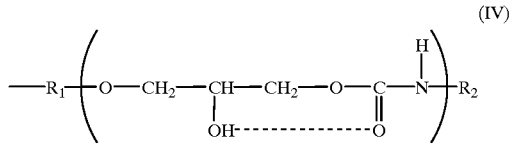

(IV)

wherein $R_1$ represents the remainder of a cyclocarbonate oligomer and $R_2$ represents the remainder of a primary amine oligomer. Without limitation, the remaining hydrogen attached to the urethane nitrogen atom is thought to be substantially unreactive because of steric hindrance.

However, each terminal primary amine group may react with up to two terminal epoxy groups to form, for example, a structure labeled as (V) in the figure below:

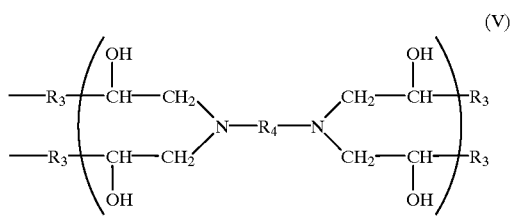

(V)

where each primary amine of a diamine oligomer is shown to be reacted with two epoxy groups, and where $R_3$ represents the remainder of four cyclocarbonate oligomers comprising a terminal epoxy group, each of which may be different from or identical to any of the other above-represented cyclocarbonate oligomers, and $R_4$ represents the remainder of a primary diamine oligomer.

Therefore, in determining the average functionality of the cyclocarbonate oligomer towards the primary amine oligomer, the difference in the reactivity of the cyclocarbonate and the epoxy groups must be taken into account. The mechanism for doing so is illustrated by the following sample functionality determinations.

For example, a difunctional cyclocarbonate oligomer wherein the reactive functional groups, or RFG, comprise 90 wt. % CC groups and 10 wt. % EP groups has a functionality of the cyclocarbonate oligomer toward a primary amine oligomer of 2.2, which is determined as follows:

| | | |
|---|---|---|
| 0.90 CC × 2 RFG/molecule × 1 CC/amine | = | 1.8 |
| 0.10 EP × 2 RFG/molecule × 2 EP/amine | = | 0.4 |
| Functionality | = | 2.2 |

For a trifunctional cyclocarbonate oligomer wherein the reactive functional groups comprise 90 wt. % CC groups and 10 wt. % EP groups, the functionality of the cyclocarbonate oligomer toward a primary amine oligomer, 3.3, is determined as follows:

| | | |
|---|---|---|
| 0.90 CC × 3 RFG/molecule × 1 CC/amine | = | 2.7 |
| 0.10 EP × 3 RFG/molecule × 2 EP/amine | = | 0.6 |
| Functionality | = | 3.3 |

For a trifunctional cyclocarbonate oligomer wherein the reactive functional groups comprise 95 wt. % CC groups and 5 wt. % EP groups, the functionality of the cyclocarbonate oligomer toward a primary amine oligomer, 3.15, is determined as follows:

| | | |
|---|---|---|
| 0.95 CC × 3 RFG/molecule × 1 CC/amine | = | 2.85 |
| 0.05 EP × 3 RFG/molecule × 2 EP/amine | = | 0.30 |
| Functionality | = | 3.15 |

By using mixtures of different cyclocarbonate oligomers, it is possible to prepare cyclocarbonate oligomer compositions with the desired average functionality toward primary amines, i.e., over the range of from about 2.0 to about 5.44 and, preferably, from about 2.6 to about 5.3. When a mixture of cyclocarbonate oligomers is present, any or all of the components of such a mixture may have a functionality toward primary amine groups less than about 2.0 or greater than about 5.44, so long as the average functionality of the mixture falls within the range of from about 2.0 to about 5.44 and, preferably, from about 2.6 to about 5.3.

For example, for a cyclocarbonate oligomer mixture comprising 20 wt. % of a tetrafunctional cyclocarbonate, i.e., functionality of 4.0, and 80 wt. % of a trifunctional cyclocarbonate oligomer wherein the reactive functional groups comprise 95 wt. % CC groups and 5 wt. % EP groups, i.e., a functionality of 3.15, the average functionality of the cyclocarbonate oligomer blend, 3.32, toward a primary amine oligomer is determined as follows:

| | | |
|---|---|---|
| 0.20 × 4.0 functionality | = | 0.80 |
| 0.80 × 3.15 functionality | = | 2.52 |
| Average Functionality | = | 3.32 |

Each cyclocarbonate oligomer of the present invention, whether used alone or in a mixture of such oligomers, typically has a number average molecular weight of from about 350 g/mol to about 3,200 g/mol and, preferably, from about 700 g/mol to about 1400 g/mol. Each cyclocarbonate oligomer of the present invention, whether used alone or in a mixture of such oligomers, typically has a viscosity at 25° C. of from about 150 mPa.s to about 8,800 mPa.s and, preferably, from about 350 mPa.s to about 1,500 mPa.s.

Preferred cyclocarbonate oligomers include but are not limited to the di-, tri-, tetra- and penta-carbonate ester, ether or amine derivatives of aromatic or aliphatic compounds comprising from 2 to 5 terminal hydroxy and/or amine functional groups and mixtures thereof, e.g., the materials described in Examples 1-1 through 1-6.

More preferred cyclocarbonate oligomers include but are not limited to those described in structures (I) and (II) above and to those shown as structures (VI), (VII) and (VIII) below:

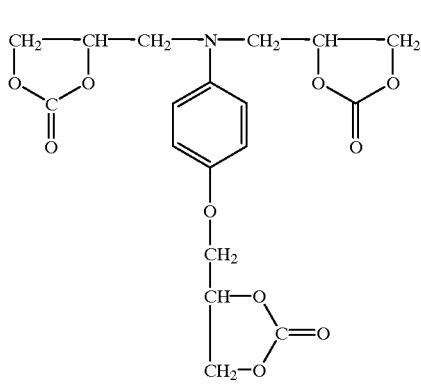
(VI)
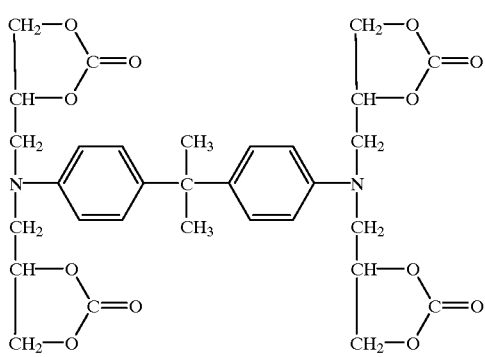
(VII)
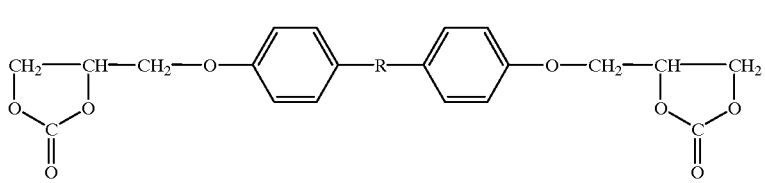
(VIII)
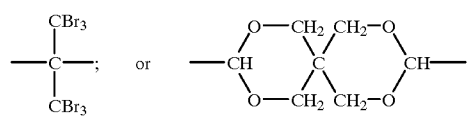
The amine reactant or reactants used in the present invention are typically oligomers comprising at least two primary amine groups, i.e., —NH$_2$. The terminal amine groups must be primary. Secondary and tertiary amine groups are not preferred. Exemplary primary amine oligomers include but are not limited to those shown below as structures (IX) and (X):
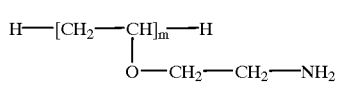
(IX)

where 2≦m≦12; and

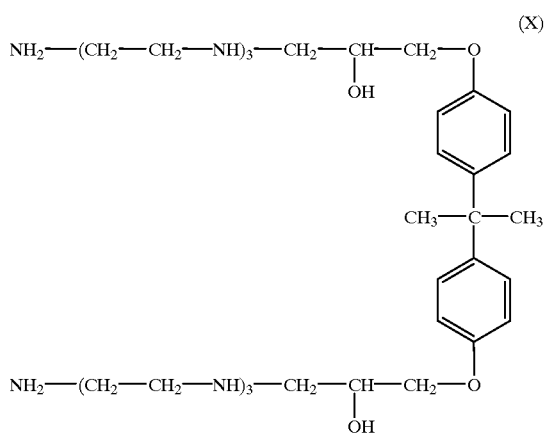

Specially synthesized oligomeric amines, some examples of which will be described in detail in Example 2, may also be used. Alternatively, in the network-forming reaction with oligomeric cyclocarbonates, commercial oligomeric primary amines, such as polyoxypropylenetriamine (JEFFAMINE® 403, Texaco Chemical Co., believed to have a molecular weight of 400 to 550 g/mol) and tris-(3-aminopropyl)-cyanurate (BASF AG, Germany) may be used.

The terminal primary amine groups of the amine oligomer may be bonded to a primary carbon atom of the oligomer, i.e., a carbon atom with two hydrogen substituents, as illustrated in structure (XI):

wherein $R_1$ and $R_2$ are hydrogen and Y is the remainder of the primary amine oligomer. Alternatively, the carbon atom adjacent to the primary amine group may be secondary, i.e., only one of $R_1$ and $R_2$ is hydrogen. It is not desirable for the carbon atom adjacent to the primary amine group to be tertiary, i.e., neither one of $R_1$ and $R_2$ in structure (XI) above is hydrogen. Preferably, the primary amine group is bonded to the remainder of the primary amine oligomer by at least one primary carbon atom adjacent to the amine group.

More preferably, a terminal primary amine group of the amine oligomer is bonded to the primary amine oligomer by at least two linked carbon atoms, where the carbon atom adjacent to the amine is a primary carbon atom, as illustrated in structure (XII):

wherein Z is the remainder of the primary amine oligomer. The carbon atom β to the primary amine group may be primary, i.e., $R_3$ and $R_4$ are hydrogen, secondary or tertiary. Preferably, the primary amine group is bonded to the remainder of the primary amine oligomer by at least two linked primary carbon atoms adjacent to the amine group, i.e., structure (XII) above where $R_3$ and $R_4$ are hydrogen.

The lowest molecular weight aliphatic primary amine oligomer which is effective in the present invention is 1,2-diaminoethane.

It is not preferred for any primary amine group to be substituted directly on an aromatic ring or separated from such a ring by only one carbon atom. Rather, each terminal primary amine group of the primary amine oligomer should be separated from an aromatic ring by at least two linked primary carbon atoms, e.g., when Z in structure (XII) above is aromatic, $R_3$ and $R_4$ are hydrogen.

It is not preferred for any primary amine group to be substituted directly on an aliphatic ring structure. Rather, each primary amine group should be separated from such a ring by at least one primary carbon atom and, preferably, by at least two linked primary carbon atoms.

When the remainder of the primary amine oligomer to which a terminal primary amine group is to be attached comprises siloxane groups, e.g., diphenyl-dimethoxysilane as illustrated in detail below in Example 2-1 or cyclohexyl-methyl-dimethoxysilane as illustrated in detail below in Example 2-2, it is preferred that the primary amine be separated from the siloxane by at least three linked primary carbon atoms.

However, it is not preferred for the amine to be bonded to the remainder of the primary amine oligomer by a chain of about twelve or more linked primary carbon atoms. Primary amine oligomers comprising such structures are thought to be to non-polar and too difficult to dissolve in the cyclocarbonate oligomer.

As discussed in detail above, each terminal primary amine group may react with only one terminal cyclocarbonate group. By using mixtures of primary amines having a different number of terminal primary amine groups per molecule, e.g., mixtures comprising diamines, triamines, tetraamines, pentaamines, hexaamines and/or heptaamines, it is possible to prepare a primary amine oligomer reactant having an average functionality toward cyclocarbonate groups over the range of from about 3.0 to about 3.8. When a mixture of primary amine oligomers is present, any or all of the components of such a mixture may have a functionality toward terminal CC groups less than about 3.0 or greater than about 3.8, so long as the average functionality of the mixture falls within the range of from about 3.0 to about 3.8.

The mechanism for determining the average functionality of the primary amine oligomer toward the cyclocarbonate oligomer is illustrated by the following example determination.

For a primary oligomer mixture comprising 20 wt. % of molecules with 10 primary amine groups per molecule, e.g., a siloxane, and 80 wt. % diamine, the average functionality of the amine oligomer, 3.6, toward the cyclocarbonate is determined as follows:

| | | |
|---|---|---|
| 0.20 × 10 amines × 1 amine/CC | = | 2.0 |
| 0.80 × 2 amines × 1 amine/CC | = | 1.6 |
| Average Functionality | = | 3.6 |

Each primary amine oligomer of the present invention, whether used alone or in a mixture of such oligomers, typically has a number average molecular weight of from about 60 g/mol to about 3,900 g/mol and, preferably, from about 180 g/mol to about 880 g/mol. Each primary amine oligomer of the present invention, whether used alone or in a mixture of such oligomers, typically has a viscosity at 25° C. of from about 10 mPa.s to about 2,800 mPa.s and, preferably, from about 50 mPa.s to about 750 mPa.s.

Preferred primary amine oligomers include but are not limited to aminosilane oligomers with a functionality toward CC of 3 to 7, e.g., the primary amine oligomer described in Examples 2-1 and 2-2 below; oligovinyl ethers of monoethanolamine with functionality toward CC of 3 to 8; monomeric triamines, tetraamines and pentaamines, e.g., tris-(3-aminopropyl)-cyanurate; polypropylenetriamine; polypropylenepentamine; and mixtures thereof.

More preferred primary amine oligomers include but are not limited to polyoxypropylenetriamine, tris-(3-aminopropyl)-cyanurate, polypropylenetriamine, polypropylenepentamine, those described in structures (IX) and (X) above and those shown as structure (XIII) below:

familiar to the skilled artisan, such as blanketing with nitrogen or an inert gas, should be taken during the synthesis of the primary amine oligomers and their handling during the formation of the nonisocyanate polyurethane networks of the present invention.

If desired, in addition to the cyclocarbonate oligomer(s) and the primary amine oligomer(s), the nonisocyanate polyurethane network can also comprise further components, examples being solvents, pigments, dyes, plasticizers, stabilizers, fillers, including active fillers which will be discussed in detail below, microspheres, reinforcing agents, for example fibers in the form of filaments, staple, mats, etc., which will be discussed in more detail below, thixotropic agents, coupling agents, catalysts and/or leveling agents. Examples of possible components are those described in Ullmann's Encyclopedia of Industrial Chemistry, 5th Edition, Vol. A18, pp. 429–471, VCH Verlagsgesellschaft, Weinheim 1991 which is incorporated herein by reference.

(XIII)

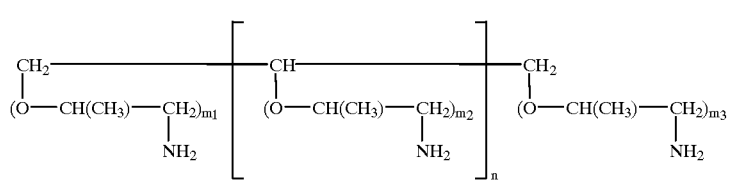

where $m_1$, $m_2$ and $m_3$ are independently selected over the range from 3 to 12 inclusive and $1 \leq n \leq 3$.

In forming the nonisocyanate polyurethane networks of the present invention, it is not preferable to have a stoichiometric amount of the cyclocarbonate oligomer react with the primary amine oligomer, e.g., a 1:1 stoichiometric ratio of terminal functional groups such that each CC group has one primary amine group available to react with it. Rather, it is preferable to have an excess of cyclocarbonate groups. The preferred amount of each oligomer present is such that the weight ratio of the amine oligomer or oligomers to the cyclocarbonate oligomer or oligomers is from about 0.93 to about 0.99 of the stoichiometric ratio, known hereafter as the "departure from the stoichiometric ratio of amine oligomer to cyclocarbonate oligomer".

The method of mixing the reactants is not critical to the success of forming the nonisocyanate polyurethane networks of the present invention. The components may be, but need not be, mixed under reduced pressure, e.g., from under atmospheric pressure, i.e., less than about 1 atm, to about 0.001 atm, to facilitate the removal of gases during mixing as is known to those with skill in the art. No catalyst is required for the reaction between the primary amine groups and the cyclocarbonate and epoxy groups to take place. No solvent is required to facilitate the reaction. However, catalysts and/or solvents may be used, if desired, as known to one skilled in the polymerization art.

The reaction of cyclocarbonate groups and diamine groups is not highly exothermic, thus, the rate of this reaction is not particularly sensitive to reaction temperature. In general, the reaction may be carried out over a temperature range of from about 10° C. to about 140° C. and, preferably, from about 15° C. to about 30° C. In general, the reaction may be carried out over a pressure range of from about 1 atm to about 10 atm, preferably, from about 2 atm to about 10 atm and, more preferably, from about 3 atm to about 5 atm. The pot life is at least about 15 minutes and, typically, is at least about 2 hours at 25° C. Since primary amine groups are reactive with air, normal precautions The amount of cross-linking in a nonisocyanate polyurethane network polymer is readily determined, e.g., by conducting a gel fraction test. The cross-linked fraction of the network, being of extremely high molecular weight, does not dissolve in some solvents while the non-cross-linked, lower molecular weight fraction does dissolve. Therefore, as is well known to those skilled in this art, the weight fraction of cross-linked material, or gel fraction, can be determined by weighing a sample of the nonisocyanate polyurethane network, dissolving out the non-cross-linked portion, and then filtering, drying and weighing the undissolved portion.

Typically, the nonisocyanate polyurethane network polymer formed has a gel fraction, i.e., the weight fraction of insoluble material, of not less than about 0.96. Preferably, the nonisocyanate polyurethane network polymer formed from the cyclocarbonate oligomer and the primary amine oligomer has a gel fraction of not less than about 0.975 and, more preferably, of not less than about 0.980.

Without limitation to any particular theory, it is believed the presence of more than about 4% of linear nonisocyanate polyurethane polymer with the network results in a gel fraction below about 0.96 and in a deterioration of the properties of the network, e.g., the mechanical properties such as tensile strength.

In a further embodiment of the present invention, the matrix of a composite material comprises a nonisocyanate polyurethane network of the present invention, these networks being characterized in detail above. Composites are generally described as a macroscopic combination of two or more components. One of the components of the composite is typically a fiber or a particulate, although fibers and particulates may both be present, and is used to reinforce the composite; therefore, this component is referred to herein as the reinforcement. The other component of the composite typically surrounds the fiber or particulate and is generally referred to as the matrix. In the composites of the present invention, the matrix comprises a nonisocyanate polyurethane network polymer.

Fibrous reinforcements useful in the composites of the present invention include but are not limited to glass fibers, such as E-glass and S-glass; carbon fibers, such as intermediate modulus polyacrylonitrile (PAN)-based intermediate modulus fibers, very high strength fibers (VHS), ultrahigh modulus fibers (UHM) and graphite fibers; aramid fibers, such as KEVLAR® 29 and KEVLAR® 49; boron fibers; polyethylene fibers; basalt fibers; ceramic fibers; silicon carbide fibers; and mixtures thereof. The fibrous reinforcement may be present in a variety of forms, for example, as short, discontinuous fibers randomly arranged, as continuous filaments arranged with their axis parallel to one another, as bundled continuous filaments also known as woven rovings, or as braids. Alternatively, two or more such arrangements of fibers may be used and oriented with their long axis parallel, perpendicular, or at some intermediate angle to each other. Such fibrous reinforcements and their arrangements are described in further detail in the "Kirk-Othmer Encyclopedia of Chemical Technology", 4th Ed., Vol. 7, pp. 1–60 (1993) which is incorporated herein by reference.

Preferred fibrous reinforcements useful in the composites of the present invention include glass, carbon and basalt fibers. Preferably, the nonisocyanate polyurethane network matrix is present in an amount of from about 12 wt. % to about 45 wt. %, based on the total weight of the composite, and the fiber reinforcement is present in an amount of from about 55 wt. % to about 85 wt. % in a fiber reinforced composite of the present invention.

The present invention is also directed to an embodiment wherein the already good chemical resistance of a nonisocyanate polyurethane network is increased even further by adding a particulate, such as an inorganic powder known as an active filler, along with the oligomeric mixture being fabricated into the network. Such a structure is also known as a particulate reinforced composite, where the active filler comprises the particulate and the nonisocyanate polyurethane network comprises the matrix.

Preferred active fillers are believed to selectively interact with an aggressive medium, e.g., acids, alkalis and/or salts, their aqueous solutions, and/or water to form a system of high-strength hydrate complexes. Such additives compliment formulations comprising nonisocyanate polyurethane networks, such as adhesives, and result in high-strength, durable inorganic filled composite adhesive cements.

Without limitation to any particular theory, it is believed that, as the active filler interacts with water or with the aggressive medium, hydrate complexes, also known as crystal-hydrates, form in the defects, e.g., micropores and/or microcracks, of the formulation. This process acts to "repair" these defects and thereby to increase the strength of the formulation. Additionally, active fillers are thought to function as barriers which inhibit the further penetration of aggressive media. Moreover, as the crystal-hydrates are formed, the volume and the specific surface area of the active filler increases. As a direct result of the increased specific surface area of the active filler, the adhesion between the filler and the nonisocyanate polyurethane is believed to become even stronger.

Active fillers include but are not limited to metal oxides and the metal aluminate salts, i.e., compounds having the formula:

wherein M is a metal ion and v is the valency of the metal, with metal aluminate salts being preferred. Preferred metals, all with a valency of 2 except where indicated in parenthesis, include Cu, Ca, Pb, Mg, Zn, Fe(3) and mixtures thereof. More preferred as active fillers are copper aluminate, calcium aluminate, lead aluminate and mixtures thereof. Even more preferred as active fillers are copper aluminate, calcium aluminate and mixtures thereof. The most preferred active filler, copper aluminate, is available commercially from Sigma Chemical and Alfa-Aesar.

An active filler can be used with any of the nonisocyanate polyurethane network compositions of the invention. The method of mixing the reactants with the active filler is not critical to the success of forming a composite from a nonisocyanate polyurethane network of the present invention. Preferably, however, the active filler is added to one reactant component before the cross-linking reaction begins. The mean particle size, e.g., diameter, of the active filler is not critical to the success of the invention, provided that it is less than or equal to about 30 μm. The mean particle diameter of the active filler typically ranges from about 2.5 μm to about 30 μm and, preferably, from about 4.5 μm to about 15 μm.

When increased resistance to an aggressive medium is desired, the active filler is typically present in an amount of from about 3 parts to about 200 parts by weight based on 100 parts of nonisocyanate polyurethane network. Preferably, from about 10 parts to about 100 parts by weight and, more preferably, from about 20 parts to about 40 parts by weight of the active filler is present in the nonisocyanate polyurethane network.

EXAMPLES

The following examples of oligomers and hybrid nonisocyanate polyurethane networks formed in accordance with the present invention are given to illustrate the present invention. However, it is to be understood that the examples are for illustrative purposes only and in no manner is the present invention limited to the specific disclosures therein.

A molecular weight of 101 g/mol was used in calculating the wt. % of terminal cyclocarbonate groups of a cyclocarbonate oligomer. This molecular weight is arrived at by combining the molecular weight of a cyclocarbonate group, 87 g/mol, and the molecular weight of a —$CH_2$— unit connecting the cyclocarbonate group to the remainder of the cyclocarbonate oligomer. Thus, for purposes of such calculations in this application, a terminal cyclocarbonate group has a molecular weight of 101 g/mol and a molecular formula of $C_4H_5O_3$.

A molecular weight of 57 g/mol was used in calculating the wt. % of terminal epoxy groups of a cyclocarbonate oligomer. This molecular weight is arrived at by combining the molecular weight of an epoxy group, 43 g/mol, and the molecular weight of a —$CH_2$— unit connecting the epoxy group to the remainder of the cyclocarbonate oligomer. Thus, for purposes of such calculations in this application, a terminal epoxy group has a molecular weight of 57 g/mol and a molecular formula of $C_3H_5O$.

A molecular weight of 30 g/mol was used in calculating the wt. % of terminal primary amine groups of a primary amine oligomer. This molecular weight is arrived at by combining the molecular weight of a primary amine group, 16 g/mol, and the molecular weight of a —$CH_2$— unit connecting the primary amine group to the remainder of the primary amine oligomer. Thus, for purposes of such calculations in this application, a terminal primary amine group has a molecular weight of 30 g/mol and a molecular formula of $CH_4N$.

Example 1

Synthesis of Cyclocarbonate Oligomers

Example 1-1

To the glycidyl ether of diaminophenol known as ARALDITE® MY 0510 (Ciba Geigy AG, Switzerland) was added 0.7% by weight of tetraethyl ammonium chloride. The mixture was placed in a wiped-film still (Pope Scientific, Inc.) and heated to 95° C. Carbon dioxide gas was bubbled through the mixture for 190 minutes at a pressure of 7.5 atm. IR spectroscopy indicated that the synthesized oligomer had 45.4 wt. % of cyclocarbonate groups and 2.9 wt. % of epoxy groups. Thus, the weight ratio of cyclocarbonate groups:epoxy groups was 1:0.064. The molecular weight of the cyclocarbonate oligomer was 666 g/mol and its functionality, as determined by its reactivity toward primary amines, was 3.17.

Example 1-2

To the triglycidyl ether of oligoepichlorohydrintriol known as OXILIN® 6a (SIAC, Russia) was added 0.45% by weight of tetramethyliodide of ammonium. The mixture was placed in a wiped-film still and heated to 65° C. Carbon dioxide gas was bubbled through the mixture for 280 minutes at a pressure of 8 atm. IR spectroscopy indicated that the synthesized oligomer had 17.2 wt. % of cyclocarbonate groups and 1.9 wt. % of epoxy groups. Thus, the weight ratio of cyclocarbonate groups:epoxy groups was 1:0.11. The molecular weight of the cyclocarbonate oligomer was 1668 g/mol and its functionality was 2.9.

Example 1-3

To the glycidyl ether of 4,4'-diaminodiphenylmethane known as ARALDITE® MY 720 (Ciba Geigy AG) was added 0.35% by weight of hydrazine hydrochloride. The mixture was placed in a wiped-film still and heated to 105° C. Carbon dioxide gas was bubbled through the mixture for 290 minutes at a pressure of 8.5 atm. IR spectroscopy indicated that the synthesized oligomer had 24.9 wt. % of cyclocarbonate groups and 3.3 wt. % of epoxy groups. Thus, the weight ratio of cyclocarbonate groups:epoxy groups was 1:0.13. The molecular weight of the cyclocarbonate oligomer was 1124 g/mol and its functionality was 4.2.

Example 1-4

To the glycidyl ether of neopentyldiol known as XD-7114 (Dow Chemical Co.) was added 0.55% by weight of hydrazine hydrobromide. The mixture was placed in a wiped-film still and heated to 70° C. Carbon dioxide gas was bubbled through the mixture for 200 minutes at a pressure of 6.0 atm. IR spectroscopy indicated that the synthesized oligomer had 43.6 wt. % of cyclocarbonate groups and 1.4 wt. % of epoxy groups. Thus, the weight ratio of cyclocarbonate groups:epoxy groups was 1:0.032. The molecular weight of the cyclocarbonate oligomer was 480 g/mol and its functionality was 2.05.

Example 1-5

To the pentaglycidic ester of oligooxypropylenepentol known as LAPROXID® 805 (Makromer, Russia) was added 0.65% by weight of tetraethyl ammonium chloride. The mixture was placed in a wiped-film still and heated to 90° C. Carbon dioxide gas was bubbled through the mixture for 300 minutes at a pressure of 7.5 atm. IR spectroscopy indicated that the synthesized oligomer had 37.8 wt. % of cyclocarbonate groups and 3.6 wt. % of epoxy groups. Thus, the weight ratio of cyclocarbonate groups:epoxy groups was 1:0.096. The molecular weight of the cyclocarbonate oligomer was 1285 g/mol and its functionality was 5.44.

Example 1-6

To the glycidyl ether of bisphenol F known as ARALDITE® PY 306 (Ciba Geigy AG) was added 0.4% by weight of tetramethyliodide of ammonium. The mixture was placed in a wiped-film still and heated to 75° C. Carbon dioxide gas was bubbled through the mixture for 210 minutes at a pressure of 9.5 atm. IR spectroscopy indicated that the synthesized oligomer had 29.4 wt. % of cyclocarbonate groups and 2.2 wt. % of epoxy groups. Thus, the weight ratio of cyclocarbonate groups:epoxy groups was 1:0.076. The molecular weight of the cyclocarbonate oligomer was 591 g/mol and its functionality was 2.07.

Example 2

Synthesis of Primary Amine Oligomers

Example 2-1

53.6 g 3-aminopropyl-triethoxysilane (Hüls AG, Germany) was mixed with 39.6 g of diphenyl-dimethoxysilane (Hüls AG) and 6.6 g of water in a stirred reactor. After 5 hours of mixing at 20° C., ethanol and methanol were vacuum distilled off. The product amine oligomer had a functionality of 5.98, as determined by its reactivity toward cyclocarbonate groups, and a molecular weight of 2190 g/mol.

Example 2-2

59.2 g 3-aminopropyl-triethoxysilane (Hüls AG) was mixed with 33.6 g of cyclohexyl-methyl-dimethoxysilane (Hüls AG) and 7.2 g water in a stirred reactor. After 6 hours of mixing at 20° C., the alcohols were vacuum distilled off. The product amine oligomer had a functionality of 5.96 and a molecular weight of 1970 g/mol.

Example 2-3

270.5 g of diglycidyl-1,1-bis(dioxymethyl)-3,4-epoxycyclohexane (known as resin "UP-65OT", obtained from the experimental plant of the Plastic Research Institute, Donetzk, Ukraine) was mixed with 216.0 g of 1,4-butylenediamine in a stirred reactor and mixed for 4 hours at 65° C. The product amine oligomer had a functionality of 2.93 and a molecular weight of 505 g/mol.

Example 3

Preparation of a Hybrid Network Nonisocyanate Polyurethane

The cyclocarbonate oligomers of Examples 1-1 and 1-2 were mixed in a ratio of 1:0.8 respectively by weight (55.6 g of 1-1 and 44.4 g of 1-2) for 5 minutes at 20° C. in a low velocity mixer. This oligomer mixture, component "A", had an average functionality (determined by its reactivity toward primary amine groups) of 3.05, 32.8 wt. % of cyclocarbonate terminal groups and 2.4 wt. % of epoxy terminal groups. Thus, the weight ratio of cyclocarbonate groups:epoxy groups was 1:0.073.

Polyoxypropylenetriamine, known as JEFFAMINE® 403 and with a functionality of 2.98 as determined by its reactivity toward cyclocarbonate groups, and the amine oligomer of Example 2-2 were mixed in a ratio of 1:0.2 respectively by weight (72.05 g of polyoxypropylenetriamine and 14.45 g of 2-2) for 5 minutes at 20° C. in a low velocity mixer. This mixture of such amines, component "B", had an average functionality (determined by its reactivity toward cyclocarbonate groups) of 3.475.

The stoichiometric ratio for mixing the CC groups of the above-described A component with the primary amine groups of the above-described B component, B:A, was calculated to be 0.878:1, i.e., 87.8 g of B per 100 g of A. This ratio was determined by dividing the average functionality of component A by the average functionality of component B, i.e., 3.05/3.475. An excess of cyclocarbonate groups was assured by mixing only 86.5 g of B with 100 g of A, i.e., a B:A ratio of 0.865:1. Therefore, the actual B:A ratio of 0.865:1 differs from the stoichiometric B:A ratio of 0.878:1, being 98.5% of the latter. Thus, the departure from the stoichiometric ratio of amine oligomer to cyclocarbonate oligomer is 0.985.

The A and B components were mixed at a B:A ratio of 0.865:1 for 15 minutes at 20° C. in a low velocity mixer. The particular method of mixing is not critical to the success of the reaction. The mixture was then poured out and allowed to cross-link or cure for 10 days at the 20° C. The resulting network polymer had an intermolecular distance, as characterized by the number average molecular weight, of 882 g/mol and contained 0.987 by weight of gel. According to IR analysis, the post-reaction weight ratio of reacted CC groups to reacted EP groups was 1:0.08 (31.7 wt. % CC:2.5 wt. % EP).

Example 4
Hybrid Nonisocyanate Polyurethane Network Compositions and Properties

Using both the oligomers synthesized in the examples above and commercially available reactants, sample nonisocyanate polyurethane network compositions were prepared with various ratios of cyclocarbonate terminal groups to epoxy terminal groups, with various average functionalities of amine oligomer components, with various average functionalities of the cyclocarbonate oligomer components, and with various departures from the stoichiometric ratio of amine oligomer to cyclocarbonate oligomer components. These sample compositions have the chemical compositions and physical properties shown in Tables 1 and 2.

The tensile properties were determined according to the method prescribed by ASTM D 638-84.

The gel fraction was determined by taking a 5 to 10 g sample of each network formed, weighing it, wrapping it with filter paper and placing the sample into a Soxhlet extraction apparatus. Each sample was extracted with a boiling mixture of 20% ethyl alcohol/80% toluene until it reached constant weight, generally in 3 to 7 days. The gel fraction was determined by dividing the final weight by the initial eight.

TABLE 1

Compositions and Properties of Hybrid Nonisocyanate Polyurethane Networks

| SAMPLE NO. | 1C | 2C | 3 | 4 | 5 | 6 | 7 | 8 | 9C | 10C |
|---|---|---|---|---|---|---|---|---|---|---|
| COMPOSITION | | | | | | | | | | |
| Weight Ratio of CC:EP | 1:0.03 | | 1:0.04 | | 1:0.08 | | 1:0.12 | | 1:0.13 | |
| Average Functionality of Oligomers: | | | | | | | | | | |
| Amine | 3.0 | 3.8 | 3.0 | 3.8 | 3.0 | 3.8 | 3.0 | 3.8 | 3.0 | 3.8 |
| Cyclocarbonate | 5.3 | 2.6 | 5.3 | 2.6 | 5.3 | 2.6 | 5.3 | 2.6 | 5.3 | 2.6 |
| Departure from Stoichiometric Ratio of Amine Oligomer/Cyclocarbonate Oligomer | 0.93 | 0.93 | 0.93 | 0.93 | 0.98 | 0.98 | 0.97 | 0.97 | 0.97 | 0.97 |
| PROPERTIES | | | | | | | | | | |
| Tensile Strength ($\sigma$), MPa | 38.3 | 32.7 | 42.3 | 39.0 | 44.1 | 39.2 | 49.0 | 39.7 | 44.3 | 38.6 |
| Ultimate Elongation ($\epsilon$), % | 40.1 | 50.4 | 41.5 | 59.8 | 40.7 | 55.8 | 40.6 | 54.6 | 32.0 | 42.3 |
| Gel-Fraction, by weight | 0.960 | 0.975 | 0.990 | 0.985 | 0.980 | 0.980 | 0.985 | 0.980 | 0.970 | 0.965 |
| Specific Energy of Failure, $\sigma \times \epsilon \times 10^{-3}$ | 1.54 | 1.65 | 1.76 | 2.33 | 1.79 | 2.19 | 1.99 | 2.17 | 1.42 | 1.63 |

TABLE 2

Compositions and Properties of Hybrid Nonisocyanate Polyurethane Networks

| SAMPLE NO. | 11C | 12 | 13C | 14C | 15 | 16C | 17C | 18 | 19 | 20C |
|---|---|---|---|---|---|---|---|---|---|---|
| COMPOSITION | | | | | | | | | | |
| Weight Ratio of CC:EP | | 1:0.04 | | | 1:0.08 | | | 1:0.12 | | |
| Average Functionality of Oligomers: | | | | | | | | | | |
| Amine | 2.9 | 3.5 | 3.9 | 2.9 | 3.2 | 3.9 | 2.8 | 3.0 | 3.8 | 3.9 |
| Cyclocarbonate | 5.4 | 3.0 | 2.5 | 5.4 | 3.3 | 2.5 | 5.4 | 5.3 | 2.6 | 3.4 |
| Departure from Stoichiometric Ratio of Amine Oligomer/Cyclocarbonate Oligomer | 0.93 | 0.93 | 0.93 | 0.98 | 0.98 | 0.98 | 0.97 | 0.97 | 0.97 | 0.97 |

TABLE 2-continued

Compositions and Properties of Hybrid Nonisocyanate Polyurethane Networks

| SAMPLE NO. | 11C | 12 | 13C | 14C | 15 | 16C | 17C | 18 | 19 | 20C |
|---|---|---|---|---|---|---|---|---|---|---|
| PROPERTIES | | | | | | | | | | |
| Tensile Strength ($\rho$), MPa | 30.7 | 43.6 | 31.8 | 30.9 | 47.5 | 32.6 | 39.8 | 45.0 | 39.7 | 30.9 |
| Ultimate Elongation ($\epsilon$), % | 42.9 | 58.7 | 50.5 | 40.7 | 49.2 | 41.0 | 37.5 | 40.6 | 54.6 | 40.1 |
| Gel-Fraction, by weight | 0.960 | 0.990 | 0.970 | 0.970 | 0.985 | 0.970 | 0.965 | 0.985 | 0.980 | 0.955 |
| Specific Energy of Failure, $\rho \times \epsilon \times 10^{-3}$ | 1.32 | 2.56 | 1.61 | 1.,26 | 2.34 | 1.34 | 1.49 | 1.83 | 2.17 | 1.24 |

It is apparent from the results presented in Tables 1 and 2 that, in general, the hybrid nonisocyanate polyurethane networks of the present invention, i.e., Sample Nos. 3–8, 12, 15, 18 and 19, have good mechanical properties as demonstrated by their tensile strengths, ultimate elongations and specific energies of failure.

On the other hand, it is apparent that if the weight ratio of CC:EP groups is too low, i.e., below about 1:0.04 or below about 4 wt. % EP, the properties of the network are degraded. For example, for Sample Nos. 1C and 2C of Table 1 with a CC:EP weight ratio of 1:0.03, the tensile strength and specific energy of failure are lower than the corresponding values for any of the samples of the invention, i.e., Sample Nos. 3–8.

Additionally, if the weight ratio of CC:EP groups is too high, i.e., above about 1:0.12 or above about 12 wt. % EP, the properties of the network are also degraded. For example, for Sample No. 9C of Table 1 with a CC:EP weight ratio of 1:0.13, the ultimate elongation and specific energy of failure are lower than the corresponding values for any of the samples of the invention, i.e., Sample Nos. 3–8. For the other sample of Table 1 with a CC:EP weight ratio of 1:0.13, Sample No. 10C, the tensile strength and specific energy of failure are lower than the corresponding values for any of the samples of the invention.

If the average functionality of the primary amine oligomer toward terminal cyclocarbonate groups is too high, i.e., above about 3.8, the properties of the network are degraded. For example, for Sample Nos. 13C, 16C and 20C of Table 2, all with an amine average functionality value of 3.9, the tensile strength and specific energy of failure are lower than the corresponding values for any of the samples of the invention, i.e., Sample Nos. 12, 15, 18 and 19.

On the other hand, if the average functionality of the primary amine oligomer toward terminal cyclocarbonate groups is too low, i.e., below about 3.0, the properties of the network are also degraded. For example, for Sample Nos. 11C and 14C of Table 2, both with an amine average functionality value of 2.9, the tensile strength and specific energy of failure are lower than the corresponding values for any of the samples of the invention, i.e., Sample Nos. 12, 15, 18 and 19. Similarly, for the other sample of Table 2 with a low amine average functionality value, 2.8 for Sample No. 17C, the ultimate elongation and specific energy of failure are lower than the corresponding values for any of the samples of the invention.

Additionally, if the gel fraction is too low, i.e., below about 0.96, the properties of the network are degraded. For example, Sample No. 20C, with a gel fraction of 0.955 and a specific energy of failure of 1.24, has the lowest specific energy of failure for any of the samples present in Tables 1 and 2.

Example 5

Hybrid Nonisocyanate Polyurethane Network Comprising an Active Filler

A series of particulate reinforced composites was formed using, as a matrix, 100 parts by weight of the composition prepared as described in Example 3. Copper aluminate (Sigma Chemical) with a particle diameter of about 30 $\mu$m was used, in the amounts shown in Table 3, as the active filler. Quartz powder (Solel Bone, Ltd., Israel) with a particle diameter of about 30 $\mu$m was also present in the composites as a filler in the amounts shown in Table 3.

After the matrix and fillers were mixed in a glue mixer, the samples were fully cured for 7 days at 20° C. to form particulate reinforced composite samples.

For determining the chemical resistance of these composites comprising a hybrid nonisocyanate polyurethane network and an active filler, a 30% aqueous solution of sulfuric acid was used. The coefficient of chemical resistance $K_{CR}$ is defined as:

$$K_{CR} = \sigma_\tau / \sigma_v$$

where $\sigma_\tau$ and $\sigma_v$ are the tensile strengths, determined as described above, for a sample exposed in 30% sulfuric acid for a time $\tau$ months and an unexposed control, respectively.

Table 3 summarizes the results obtained from a series of composite samples prepared as described above with the same hybrid nonisocyanate polyurethane network matrix and with different amounts of copper aluminate reinforcement. These samples were tested to determine their $K_{CR}$ after 6, 9 and 12 months exposure to 30% sulfuric acid at 20° C.

TABLE 3

Coefficient of Chemical Resistance to Aqueous 30% Sulfuric Acid

| SAMPLE NO. | 21C | 22 | 23 | 24 | 25 | 26 |
|---|---|---|---|---|---|---|
| Copper Aluminate Content[a] | 0 | 10 | 20 | 40 | 100 | 160 |
| Quartz Powder Content[a] | 160 | 150 | 140 | 120 | 60 | 0 |
| Exposure Time | | | | | | |
| 6 months | 0.87 | 1.12 | 1.14 | 1.06 | 0.98 | 0.98 |
| 9 months | 0.62 | 0.98 | 1.06 | 1.08 | 0.99 | 0.92 |
| 12 months | failed | 0.96 | 1.05 | 1.07 | 0.99 | 0.95 |

[a]In parts by weight based on 100 parts of nonisocyanate polyurethane network

It is apparent from the above results that even a control sample without an active filler, sample 21C, performed well under prolonged exposure to an aggressive medium, e.g., after 6 months exposure to 30% sulfuric acid, having a relatively high $K_{CR}$ of 0.87. However, all of the above nonisocyanate polyurethane network samples comprising an active filler retained even more of their initial tensile strength than did the control after 6 months exposure. In fact, the tensile strength of samples 22, 23 and 24 increased substantially over their initial tensile strength after 6 months exposure to 30% sulfuric acid, thereby demonstrating a beneficial effect provided by including an active filler in these sample compositions.

Even after 12 months of exposure to 30% sulfuric acid, by which time the control sample had failed, samples 22–26 all had excellent tensile strength retention. In fact, the tensile strength of samples 23 and 24 increased substantially over their initial tensile strength even after 12 months exposure to 30% sulfuric acid.

Moreover, all of the non-exposed composite samples of nonisocyanate polyurethane network matrix and active filler reinforcement were much tougher than the control without an active filler. For example, when the ellipse of failure was determined from multi-dimensional tensile testing, the area of the ellipse increased greatly for the actively filled composite nonisocyanate polyurethane network samples, e.g., in some instances by more than ten times over the non-composite control without an active filler.

While it is apparent that the illustrative embodiments of the invention herein disclosed fulfills the objective stated above, it will be appreciated that numerous modifications and other embodiments may be devised by those skilled in the art. Therefore, it will be understood that the appended claims are intended to cover all such modifications and embodiments which come within the spirit and scope of the present invention.

The contents of all patents cited herein are incorporated by reference in their entirety.

What is claimed is:

1. A network nonisocyanate polyurethane polymer formed by cross-linking a cyclocarbonate oligomer and an amine oligomer, wherein the cyclocarbonate oligomer has an average functionality towards primary amines from about 2.0 to about 5.44, wherein the cyclocarbonate oligomer comprises at least one cyclocarbonate-terminated oligomer terminated with a plurality of cyclocarbonate groups, wherein at least one cyclocarbonate-terminated oligomer further comprises from about 4% to about 12% by weight of terminal epoxy groups based on the weight of terminal cyclocarbonate groups present, wherein the amine oligomer has an average functionality towards cyclocarbonate groups of from about 3.0 to about 3.8, wherein the amine oligomer consists essentially of at least one primary amine-terminated oligomer, wherein each primary amine-terminated oligomer is terminated with a plurality of primary amine groups, wherein each primary amine group is linked to the at least one primary amine-terminated oligomer by a linking group comprising, independently, from at least one to about twelve carbon atoms, a first end and a second end, wherein the first end of each linking group is bonded to the nitrogen atom of the primary amine group and the second end of each linking group is bonded to the amine oligomer, and wherein each linking group carbon atom adjacent to the nitrogen atom of each primary amine group is independently selected from the group consisting of a methylene carbon atom and a methine carbon atom, provided that, (1) when the second end of the linking group is bonded to an aliphatic ring, the linking group comprises at least one methylene carbon atom wherein the first end of the linking group comprises the methylene carbon atom, (2) when the second end of the linking group is bonded to an aromatic ring, the linking group comprises at least two adjacent methylene carbon atoms wherein the first end of the linking group comprises the two adjacent methylene carbon atoms, and (3) when the second end of the linking group is bonded to an amine oligomer comprising siloxane groups, the linking group comprises at least three adjacent methylene carbon atoms wherein the first end of the linking group comprises the three adjacent methylene carbon atoms, wherein the amine oligomer is present in an amount from about 0.93 to about 0.99 of the amount of the amine oligomer that would be required to achieve a stoichiometric ratio of the primary amine groups of the amine oligomer to the cyclocarbonate groups of the cyclocarbonate oligomer, and wherein the network polymer formed has a gel fraction of not less than about 0.96 by weight.

2. The network nonisocyanate polyurethane polymer of claim 1, wherein the average functionality of the cyclocarbonate oligomer towards primary amines ranges from about 2.6 to about 5.3.

3. The network nonisocyanate polyurethane polymer of claim 1, wherein the gel fraction is not less than about 0.975.

4. The network nonisocyanate polyurethane polymer of claim 1, wherein the gel fraction is not less than about 0.980.

5. The network nonisocyanate polyurethane polymer of claim 1, wherein the cyclocarbonate-terminated oligomer has a number average molecular weight of from about 350 g/mol to about 3,200 g/mol.

6. The network nonisocyanate polyurethane polymer of claim 5, wherein the cyclocarbonate-terminated oligomer has a number average molecular weight of from about 700 g/mol to about 1400 g/mol.

7. The network nonisocyanate polyurethane polymer of claim 1, wherein the cyclocarbonate-terminated oligomer has a viscosity at 25° C. of from about 150 mPa.s to about 8,800 mPa.s.

8. The network nonisocyanate polyurethane polymer of claim 7, wherein the cyclocarbonate-terminated oligomer has a viscosity at 25° C. of from about 350 mPa.s to about 1,500 mPa.s.

9. The network nonisocyanate polyurethane polymer of claim 1, wherein the cyclocarbonate-terminated oligomer comprises at least one material selected from the group consisting of di-carbonate, tri-carbonate, tetra-carbonate and penta-carbonate ester, ether or amine derivatives of aromatic or aliphatic compounds comprising from 2 to 5 terminal functional groups selected from the group consisting of hydroxy groups, amine groups, and mixtures thereof.

10. The network nonisocyanate polyurethane polymer of claim 1, wherein the cyclocarbonate-terminated oligomer comprises at least one material selected from the group consisting of

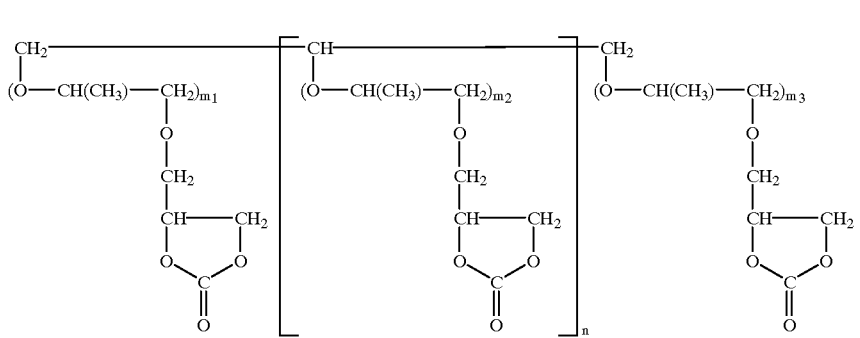
(I)
wherein $m_1$, $m_2$ and $m_3$ are independently selected over the range from 3 to 12 inclusive and wherein $0 \leq n \leq 6$,
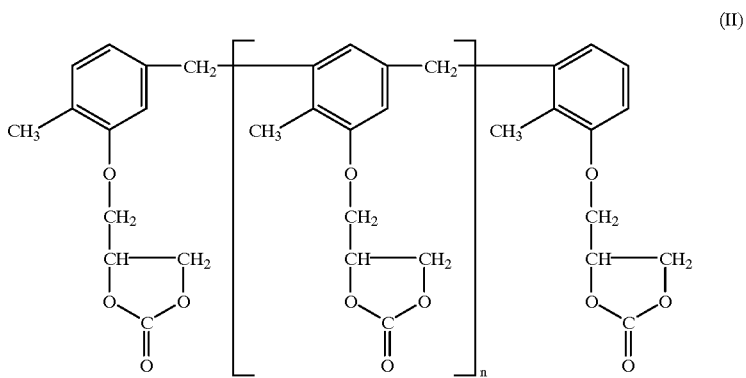
(II)
wherein $0 \leq n \leq 4$,
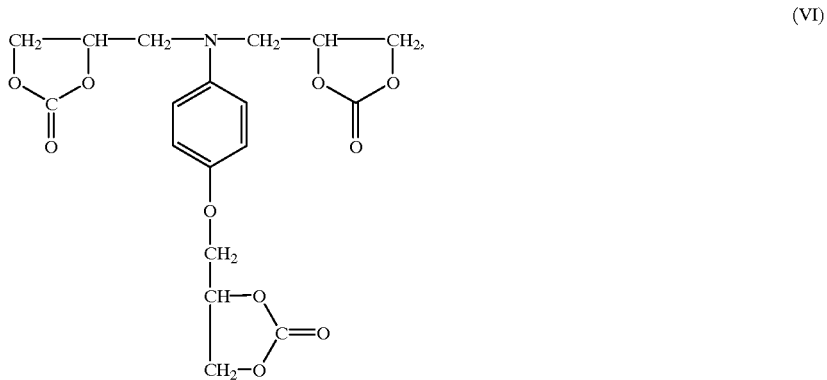
(VI)

-continued

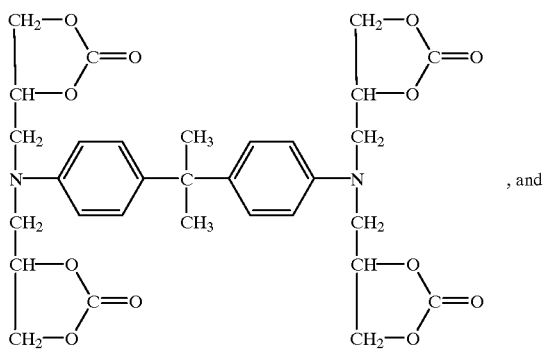

(VII)

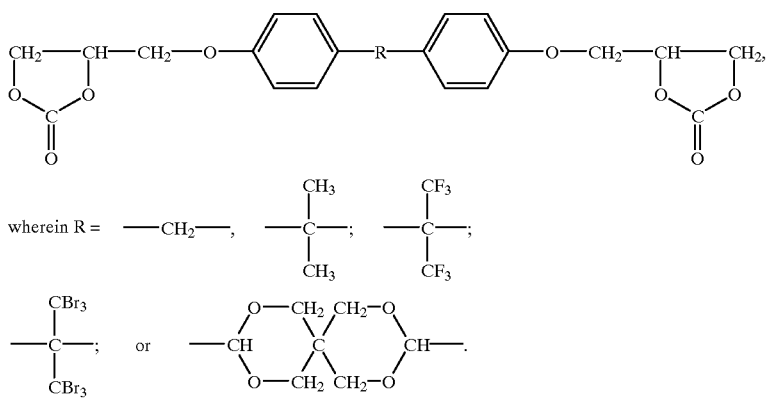

(VIII)

11. The network nonisocyanate polyurethane polymer of claim 1, wherein the at least one terminal epoxy group comprising cyclocarbonate-terminated oligomer consists essentially of a remainder and an epoxy group, wherein the epoxy group is bonded to the remainder by at least one primary carbon atom adjacent to the epoxy group.

12. The network nonisocyanate polyurethane polymer of claim 1, wherein the primary amine-terminated oligomer has a number average molecular weight of from about 60 g/mol to about 3,900 g/mol.

13. The network nonisocyanate polyurethane polymer of claim 12, wherein the primary amine-terminated oligomer has a number average molecular weight of from about 180 g/mol to about 880 g/mol.

14. The network nonisocyanate polyurethane polymer of claim 1, wherein the primary amine-terminated oligomer has a viscosity at 25° C. of from about 10 mPa.s to about 2,800 mPa.s.

15. A network nonisocyanate polyurethane polymer formed by cross-linking a cyclocarbonate oligomer and an amine oligomer,
wherein the cyclocarbonate oligomer has an average functionality towards primary amines from about 2.0 to about 5.44,
wherein the cyclocarbonate oligomer comprises at least one cyclocarbonate-terminated oligomer terminated with a plurality of cyclocarbonate groups,
wherein at least one cyclocarbonate-terminated oligomer further comprises from about 4% to about 12% by weight of terminal epoxy groups based on the weight of terminal cyclocarbonate groups present,
wherein the amine oligomer has an average functionality towards cyclocarbonate groups of from about 3.0 to about 3.8,
wherein the amine oligomer comprises at least one primary amine-terminated oligomer terminated with a plurality of primary amine groups,
wherein the primary amine-terminated oligomer has a viscosity at 25° C. of from about 50 mPa.s to about 750 mPa.s,
wherein the amine oligomer is present in an amount from about 0.93 to about 0.99 of the amount of the amine oligomer that would be required to achieve a stoichiometric ratio of the primary amine groups of the amine oligomer to the cyclocarbonate groups of the cyclocarbonate oligomer, and
wherein the network polymer formed has a gel fraction of not less than about 0.96 by weight.

16. A network nonisocyanate polyurethane polymer formed by cross-linking a cyclocarbonate oligomer and an amine oligomer,
wherein the cyclocarbonate oligomer has an average functionality towards primary amines from about 2.0 to about 5.44,
wherein the cyclocarbonate oligomer comprises at least one cyclocarbonate-terminated oligomer terminated with a plurality of cyclocarbonate groups,
wherein at least one cyclocarbonate-terminated oligomer further comprises from about 4% to about 12% by weight of terminal epoxy groups based on the weight of terminal cyclocarbonate groups present,
wherein the amine oligomer has an average functionality towards cyclocarbonate groups of from about 3.0 to about 3.8,
wherein the amine oligomer comprises at least one primary amine-terminated oligomer terminated with a plurality of primary amine groups, wherein the primary amine-terminated oligomer comprises at least one material selected from the group consisting of aminosilane oligomers with a functionality toward terminal-cyclocarbonate groups of from about 3 to about 7, oligovinyl ethers of monoethanolamine with functionality toward terminal-cyclocarbonate groups of from about 3 to about 8, monomeric triamines, monomeric tetraamines, polypropylenetriamine, polypropylenepentamine, and mixtures thereof, wherein the amine oligomer is present in an amount from about 0.93 to about 0.99 of the amount of the amine oligomer that would be required to achieve a stoichiometric ratio of the primary amine groups of the amine oligomer to the cyclocarbonate groups of the cyclocarbonate oligomer, and wherein the network polymer formed has a gel fraction of not less than about 0.96 by weight.

17. A network nonisocyanate polyurethane polymer formed by cross-linking a cyclocarbonate oligomer and an amine oligomer, wherein the cyclocarbonate oligomer has an average functionality towards primary amines from about 2.0 to about 5.44,

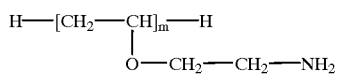

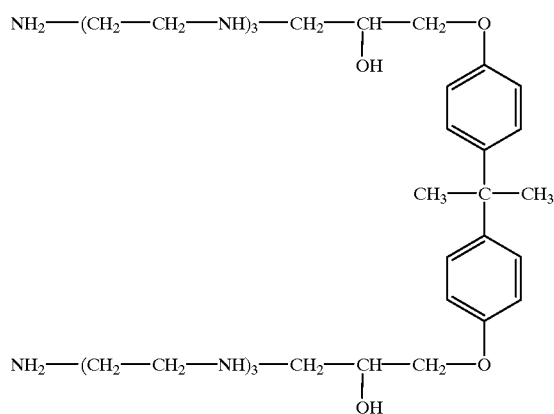

and

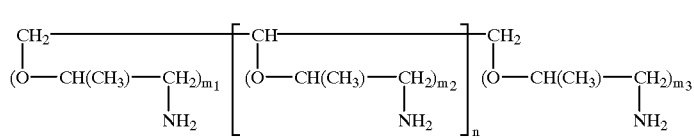

wherein $m_1$, $m_2$ and $m_3$ are independently selected over the range from 3 to 12 inclusive and wherein $1 \leq n \leq 3$, wherein the amine oligomer is present in an amount from about 0.93 to about 0.99 of the amount of the amine oligomer that would be required to achieve a stoichiometric ratio of the primary amine groups of the amine oligomer to the cyclocarbonate groups of the cyclocarbonate oligomer, and wherein the network polymer formed has a gel fraction of not less than about 0.96 by weight.

18. The network nonisocyanate polyurethane polymer of claim 1, wherein each linking group carbon atom adjacent to the nitrogen atom of each primary amine group is a methylene carbon atom.

19. The network nonisocyanate polyurethane polymer of claim 1, wherein each linking group adjacent to the nitrogen wherein the cyclocarbonate oligomer comprises at least one cyclocarbonate-terminated oligomer terminated with a plurality of cyclocarbonate groups, wherein at least one cyclocarbonate-terminated oligomer further comprises from about 4% to about 12% by weight of terminal epoxy groups based on the weight of terminal cyclocarbonate groups present, wherein the amine oligomer has an average functionality towards cyclocarbonate groups of from about 3.0 to about 3.8, wherein the amine oligomer comprises at least one primary amine-terminated oligomer terminated with a plurality of primary amine groups, wherein the primary amine-terminated oligomer comprises at least one material selected from the group consisting of polyoxypropylenetriamine, tris-(3-aminopropyl)-cyanurate, polypropylenetriamine, polypropylenepentamine, (IX)

$$H-[CH_2-CH]_m-H$$
$$\phantom{H-[CH_2-}|$$
$$\phantom{H-[CH_2-CH]_m}O-CH_2-CH_2-NH_2$$

wherein $2 \leq m \leq 12$, atom of each primary amine group comprises at least two adjacent methylene carbon atoms wherein the first end of the linking group comprises the adjacent methylene carbon atoms.

20. A method of producing a network nonisocyanate polyurethane polymer which comprises:

(a) selecting as a first oligomer at least one oligomer terminated with a plurality of cyclocarbonate groups, said cyclocarbonate-terminated oligomer further comprising from about 4% to about 12% by weight epoxy groups based on the weight of terminal cyclocarbonate groups present, wherein said first oligomer has an average functionality towards primary amines of from about 2.0 to about 5.44;

(b) selecting as a second oligomer at least one amine oligomer terminated with a plurality of primary amine groups, wherein said second oligomer has an average functionality towards cyclocarbonate groups of from about 3.0 to about 3.8 and wherein the amine oligomer consists essentially of at least one primary amine-terminated oligomer, wherein each primary amine-terminated oligomer is terminated with a plurality of primary amine groups, wherein each primary amine group is linked to the at least one primary amine-terminated oligomer by a linking group comprising, independently, from at least one to about twelve carbon atoms, a first end and a second end, wherein the first end of each linking group is bonded to the nitrogen atom of the primary amine group and the second end of each linking group is bonded to the amine oligomer, and wherein each linking group carbon atom adjacent to the nitrogen atom of each primary amine group is independently selected from the group consisting of a methylene carbon atom and a methine carbon atom, provided that,
  (1) when the second end of the linking group is bonded to an aliphatic ring, the linking group comprises at least one methylene carbon atom wherein the first end of the linking group comprises the methylene carbon atom,
  (2) when the second end of the linking group is bonded to an aromatic ring, the linking group comprises at least two adjacent methylene carbon atoms wherein the first end of the linking group comprises the two adjacent methylene carbon atoms, and
  (3) when the second end of the linking group is bonded to an amine oligomer comprising siloxane groups, the linking group comprises at least three adjacent methylene carbon atoms wherein the first end of the linking group comprises the three adjacent methylene carbon atoms;
(c) mixing the oligomers in an amount to form a mixture with a pot life such that the amount of the second oligomer present is from about 0.93 to about 0.99 of the amount of the second oligomer that would be required to achieve a stoichiometric ratio of the primary amine groups of the second oligomer to the cyclocarbonate groups of the first oligomer; and
(d) curing the mixture at a temperature of from about 10° C. to about 140° C. to form a network polymer with a gel fraction of not less than about 0.96 by weight.

21. The method of claim 20, wherein the first oligomer is selected to further comprise at least one cyclocarbonate-terminated oligomer wherein the reactive terminal groups consist essentially of cyclocarbonate groups.

22. The method of claim 20, wherein the average functionality of the first oligomer towards primary amines ranges from about 2.6 to about 5.3.

23. The method of claim 20, which further comprises forming a network polymer with a gel fraction of not less than about 0.975.

24. The method of claim 20, which further comprises forming a network polymer with a gel fraction of not less than about 0.980.

25. The method of claim 20, which further comprises mixing the oligomers at a pressure of from about 0.001 atm to less than about 1 atm.

26. The method of claim 20, which further comprises curing the mixture at a temperature of from about 15° C. to about 30° C.

27. The method of claim 20, which further comprises curing the mixture at a pressure of from about 1 atm to about 10 atm .

28. The method of claim 27, which further comprises curing the mixture at a pressure of from about 2 atm to about 10 atm.

29. The method of claim 27, which further comprises curing the mixture at a pressure of from about 3 atm to about 5 atm.

30. The method of claim 20, wherein the pot life is at least about 15 minutes at 25° C.

31. The method of claim 20, wherein the pot life is at least about 2 hours at 25° C.

32. The method of claim 20, wherein each cyclocarbonate-terminated oligomer has a number average molecular weight of from about 350 g/mol to about 3,200 g/mol.

33. The method of claim 21, wherein each cyclocarbonate-terminated oligomer has a number average molecular weight of from about 350 g/mol to about 3,200 g/mol.

34. The method of claim 20, wherein each cyclocarbonate-terminated oligomer has a viscosity at 25° C. of from about 150 mPa.s to about 8,800 mPa.s.

35. The method of claim 21, wherein each cyclocarbonate-terminated oligomer has a viscosity at 25° C. of from about 150 mPa.s to about 8,800 mPa.s.

36. The method of claim 20, wherein each oligomer terminated with a plurality of primary amine groups has a number average molecular weight of from about 60 g/mol to about 3,900 g/mol.

37. The method of claim 20, wherein each oligomer terminated with a plurality of primary amine groups has a viscosity at 25° C. of from about 10 mPa.s to about 2,800 mPa.s.

38. A composite material comprising a matrix and a reinforcement, wherein the matrix comprises the network nonisocyanate polyurethane polymer of claim 1.

39. The composite material of claim 38, wherein the matrix is present in an amount of from about 12 wt. % to about 45 wt. %.

40. The composite material of claim 38, wherein the reinforcement is selected from the group consisting of a fiber reinforcement, a particulate reinforcement, and mixtures thereof.

41. The composite material of claim 40, wherein the fiber reinforcement is selected from the group consisting of glass fiber, carbon fiber, basalt fiber, and mixtures thereof.

42. The composite material of claim 40, wherein the particulate reinforcement comprises an active filler, wherein the active filler is at least one material selected from the group consisting of a metal oxide and a metal aluminate salt.

43. The composite material of claim 42, wherein the metal aluminate salt is selected from the group consisting of copper aluminate, calcium aluminate, lead aluminate, magnesium aluminate, zinc aluminate, iron aluminate, and mixtures thereof.

44. The composite material of claim 42, wherein the metal aluminate salt is selected from the group consisting of copper aluminate, calcium aluminate, and mixtures thereof.

45. The composite material of claim 42, wherein the metal aluminate salt is copper aluminate.

46. The composite material of claim 42, wherein the active filler is present in an amount of from about 3 parts to about 200 parts by weight based on 100 parts of the network nonisocyanate polyurethane polymer.

47. The composite material of claim 46, wherein the active filler is present in an amount of from about 10 parts to about 100 parts by weight based on 100 parts of the network nonisocyanate polyurethane polymer.

48. The composite material of claim 47, wherein the active filler is present in an amount of from about 20 parts to about 40 parts by weight based on 100 parts of the network nonisocyanate polyurethane polymer.

49. The composite material of claim 42, wherein the mean particle size of the active filler is less than or equal to about 30 µm.

50. The composite material of claim 42, wherein the mean particle diameter of the active filler is from about 2.5 µm to about 30 µm.

51. The composite material of claim 50, wherein the mean particle diameter of the active filler is from about 4.5 µm to about 15 µm.

\* \* \* \* \*